(12) United States Patent
Chen et al.

(10) Patent No.: US 8,002,454 B2
(45) Date of Patent: Aug. 23, 2011

(54) BACKLIGHT ASSEMBLY

(75) Inventors: Ming-Lung Chen, Hsin-Chu (TW);
Chih-Kang Tung, Hsin-Chu (TW);
Chih-Wei Chang, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 264 days.

(21) Appl. No.: 12/390,510

(22) Filed: Feb. 23, 2009

(65) Prior Publication Data
US 2010/0182767 A1 Jul. 22, 2010

(30) Foreign Application Priority Data
Jan. 16, 2009 (TW) .............................. 98101498 A

(51) Int. Cl.
F21V 7/04 (2006.01)
(52) U.S. Cl. ........ 362/613; 362/614; 362/367; 362/558; 362/621
(58) Field of Classification Search .................. 362/367, 362/616, 601, 603, 614, 621; 349/63, 65
See application file for complete search history.

(56) References Cited

U.S. PATENT DOCUMENTS

| | | | | |
|---|---|---|---|---|
| 5,889,568 A * | 3/1999 | Seraphim et al. | | 349/73 |
| 6,241,358 B1 * | 6/2001 | Higuchi et al. | | 362/613 |
| 7,350,957 B2 * | 4/2008 | Liao | | 362/621 |
| 7,420,158 B2 * | 9/2008 | Ohno et al. | | 250/239 |
| 7,458,709 B2 * | 12/2008 | Lang et al. | | 362/612 |
| 7,465,079 B1 * | 12/2008 | Cull et al. | | 362/471 |
| 7,490,963 B2 * | 2/2009 | Fang et al. | | 362/330 |
| 7,597,469 B2 * | 10/2009 | Nishigaki | | 362/616 |
| 7,748,884 B2 * | 7/2010 | Yoshino et al. | | 362/631 |
| 2002/0118320 A1 * | 8/2002 | Bayrle et al. | | 349/73 |
| 2006/0002106 A1 * | 1/2006 | Hong et al. | | 362/224 |
| 2006/0007112 A1 * | 1/2006 | Park | | 345/102 |
| 2006/0119565 A1 * | 6/2006 | Matsumoto | | 345/102 |
| 2006/0120108 A1 * | 6/2006 | Huang et al. | | 362/613 |
| 2006/0274549 A1 * | 12/2006 | Fukuyoshi | | 362/602 |
| 2007/0024570 A1 * | 2/2007 | Kumamoto | | 345/102 |
| 2007/0247871 A1 | 10/2007 | Yoo | | |
| 2008/0170414 A1 | 7/2008 | Wang | | |
| 2008/0239202 A1 * | 10/2008 | Won et al. | | 349/64 |

FOREIGN PATENT DOCUMENTS
TW I240109 9/2005
TW I247951 1/2006
* cited by examiner

*Primary Examiner* — Ali Alavi
(74) *Attorney, Agent, or Firm* — Winston Hsu; Scott Margo

(57) ABSTRACT

Backlight assembly includes a plurality of light guide plates, a plurality of light modules, and a plurality of driving units separately in control of corresponding light modules which are configured at the incident sides of the LGPs. Each light module faces two adjacent LGPs such that the driving unit drives the light module to provide light for two adjacent LGPs at the same time. As local dimming function is switched, besides the power-saving and the high contrast, the local edge effect due to the joint of the LGPs can be reduced.

21 Claims, 10 Drawing Sheets

BACKLIGHT ASSEMBLY

BACKGROUND OF THE INVENTION

1. Field of the Invention

The present invention relates to a backlight assembly, and more particularly, to a combinative edge lighting backlight assembly with misaligning light sources and light guide plates.

2. Description of the Prior Art

In a traditional edge lighting backlight assembly, light enters from the side. Such structure makes it difficult to maintain light uniformity as the size of the backlight assembly increases. Combination of a number of smaller-sized light guide plates to form a large light guide plate is therefore carried out, each smaller-sized light guide plate receiving light from a stand-along light module, such that a large size edge lighting backlight assembly can still have its luminance and uniformity above a standard.

Compared to the single large-sized light guide plate, light emitted from every block of the combination of all the small-sized light guide plates may differ from one another, because of the difference of physical property of each light guide plate and the light module, and the way the light guide plates assemble with the light modules. On the other hand, the joint between two light guide plates shows discontinuity. The edge fault of the light guide plate is a common problem in the combinative backlight assembly because the backlight assembly is configured with a light source corresponding to a light guide plate.

Additionally, when a direct-type backlight assembly uses light emitting diodes (LEDs) as the light source, turning on part of the LEDs can save power for the backlight assembly, when maximum Luminance is unnecessary. The backlight assembly can also have greater contrast by turning on only part of the LEDs. Such technique is called local dimming. Please refer to FIG. 1. FIG. 1 is a diagram of display effect of a display 10 when a combinative edge lighting backlight assembly performs its local dimming function according to the prior art. When applying local dimming function on an edge lighting backlight assembly, however, the edge between a block with light turning on and a block with light turning off can be much more obvious since the light guide plate and the light source are configured one by one Although the direct-type backlight assembly has better performance with local dimming, the thickness of the direct-type backlight assembly is greater than that of the edge lighting backlight assembly.

SUMMARY OF THE INVENTION

The present invention provides a backlight assembly, which includes a back plate, a first light guide plate, a second light guide plate, a light module, and a driving unit. The first light guide plate is configured on the back plate and has a first incident side. The second light guide plate is arranged adjacent to the first light guide plate along a first direction, configured on the back plate, and has a second incident side. The light module is configured for facing both the first incident side and the second incident side. The driving unit drives the light module to provide the same batch of incident light for the first incident side and the second incident side at the same time.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
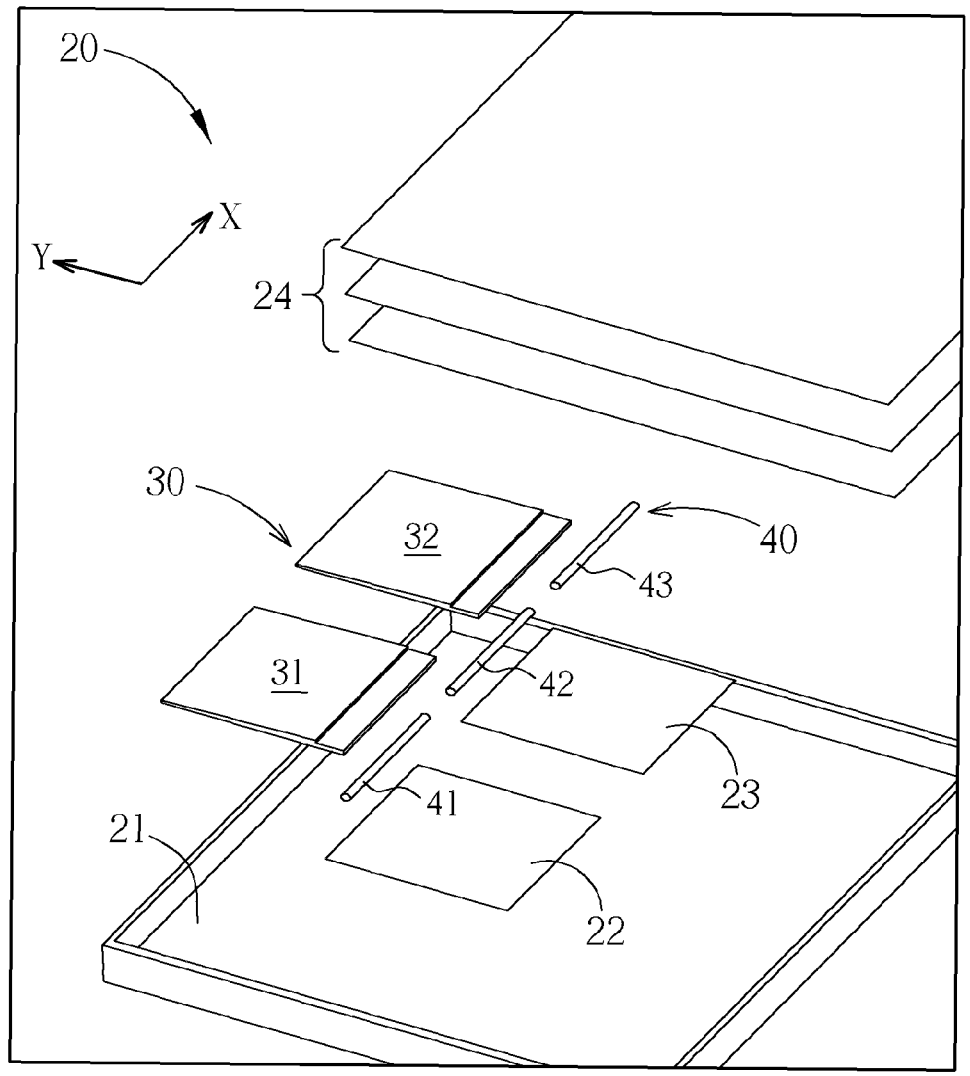
FIG. 2 is a perspective explosive diagram of a first embodiment of a backlight assembly according to the present invention.
Figure 9:
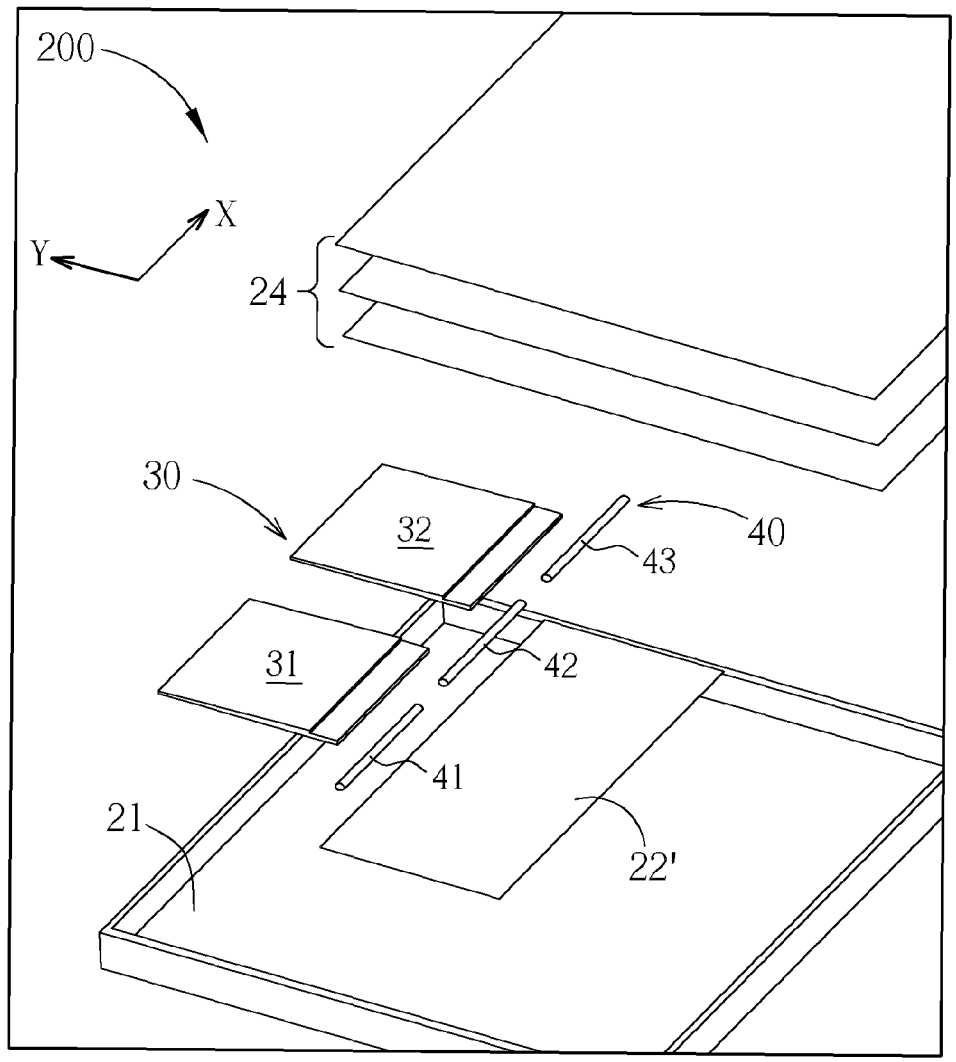
FIG. 9 is a perspective explosive diagram of a fourth embodiment of the backlight assembly according to the present invention.

Please refer to FIG. 2. FIG. 2 is a perspective explosive diagram of a first embodiment of a backlight assembly 20 according to the present invention. The backlight assembly 20 includes a back plate 21, a light module group 40, a light guide plate group 30 (LGP group), a plurality of driving units 51~56 (shown in FIG. 3), and an optical film group (or an optical plate group) 24. The light module group 40, the light guide plate group 30, and the optical film group 24 are sequentially configured on the back plate 21. One or more reflectors 22, 23 are further configured between the back plate 21 and the light guide plate group 30. The reflectors 22, 23 are configured facing light guide plates 31, 32 respectively. However, a single long reflector or one reflector 22' (shown in a fourth embodiment in FIG. 9) can also correspond to the plurality of light guide plates 31, 32. The back plate 21 can be housing that fixes or surrounds other components, and can be a metal cover made of Aluminum or Aluminum alloy material. The element function and the configuration way of the reflectors 22, 23 and the optical film group 24 can be known by person of ordinary skill in the art and should be omitted for brevity purpose.

Figure 3:
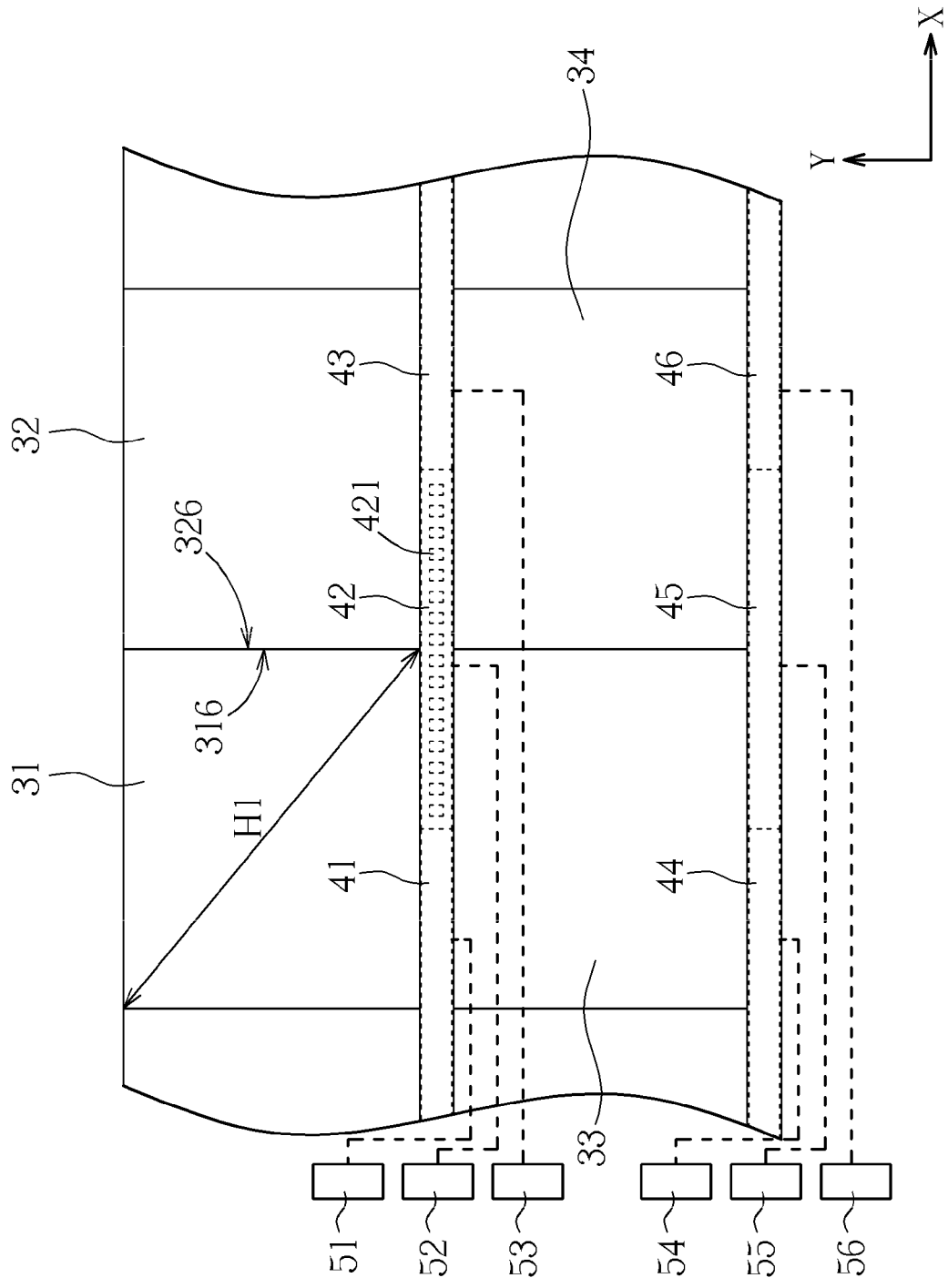
FIG. 3 is a plane diagram of the first embodiment of the backlight assembly according to the present invention.

In the lighting backlight assembly 20 including a small-sized light guide plate group 30 and the light module group 40, all light modules 41~46 of the light module group 40 are configured misaligning with corresponding two of the light guide plates 31~34 of the light guide plate group 30 respectively. FIG. 3 shows that each of the light modules 41~46 is controlled by a corresponding one of driving units 51~56. In other words, each of the light guide plates 31~34 can receive light from the corresponding two of the light modules 41~46. For example, the light guide plate 31 can receive light from the light modules 41, 42, and the light guide plate 32 can receive light from the light modules 42, 43. Each of the light guide plates 31~34 can be formed as plane surface wedge-shaped plate by injection molding manner, made of Polymethyl Methacrylate (PMMA) material or other high transmittance material.

Please refer to FIG. 3. FIG. 3 is a plane diagram of the first embodiment of the backlight assembly according to the present invention. A large light guide plate can be decomposed to many small light guide plates to manufacture large-size display panel. For example, a light guide plate for a 46-inches liquid-crystal display can be decomposed to 16×8 (128) pieces small light guide plates. In this embodiment, the light guide plates 31~34 are arranged in a matrix manner, for descriptive purpose, the light guide plates 31, 32 and the light guide plates 33, 34 are arranged along a first direction X respectively, while the light guide plates 31, 33 and the light guide plates 32, 34 are arranged along a second direction Y respectively. The range of diagonal length of each of the light guide plates 31~34 is between 3.4 inches and 10 inches. Although each of the light guide plates 31~34 is identical in shape and size presenting this embodiment, they can also have different shape and size in actual application, as long as they form a big light guide plate through combinative way.

Figure 4:
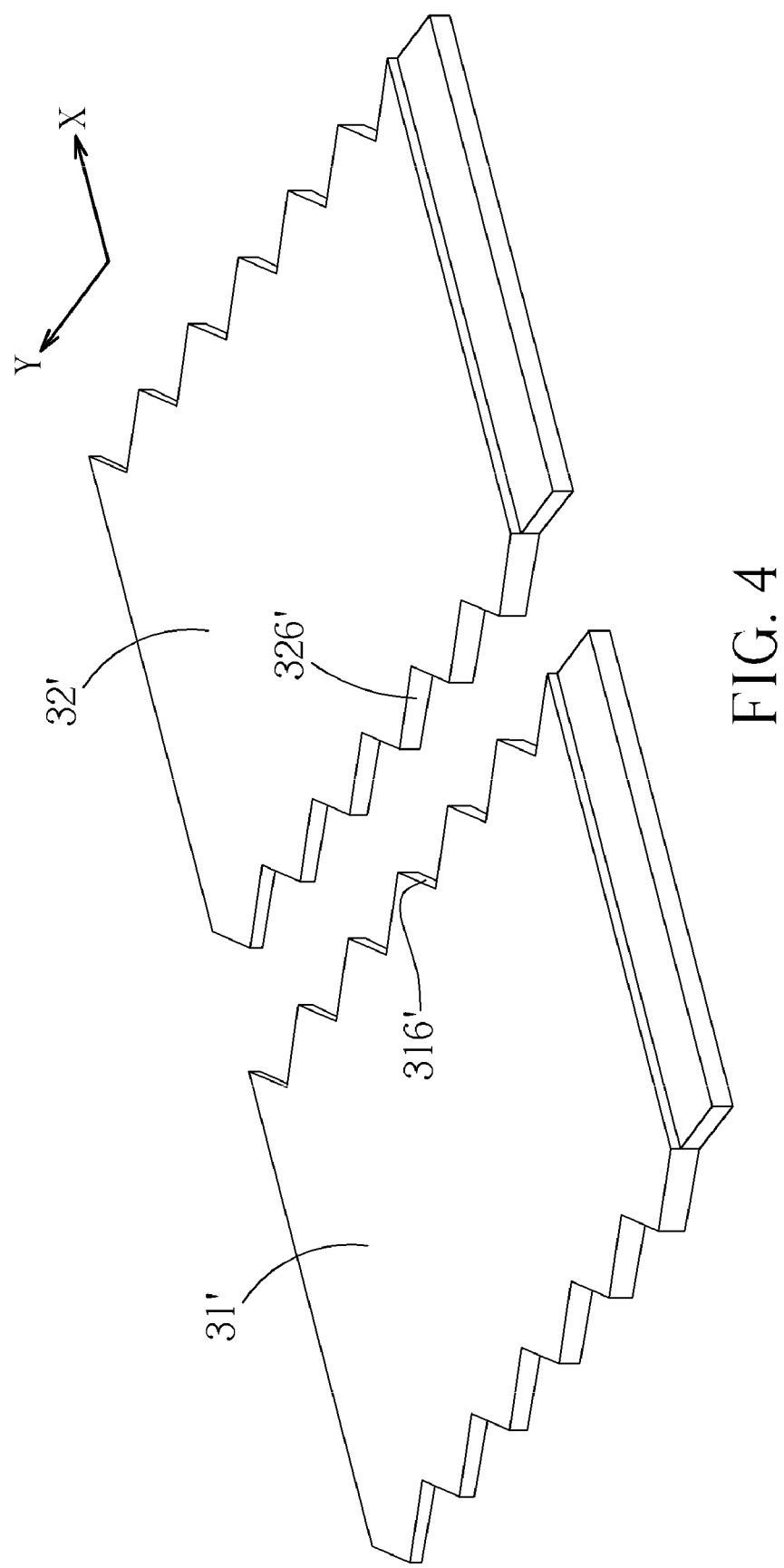
FIG. 4 is a perspective diagram of a second embodiment of a light guide plate according to the present invention.

In the embodiment in FIG. 3, the light guide plates 31~34 have plane sides respectively. For example, the light guide plate 31 has a side 316 and the light guide plate 32 has a side 326 along the second direction Y. The light guide plates 31 is adjacent to the light guide plate 32 by the sides 316, 326 contacting or matching with each other such that the light guide plates 31, 32 can be arranged along the first direction X. Additionally, the light guide plate 31 can be adjacent to the light guide plate 32 in another way for increasing light transmissible effect between the light guide plate 31 and the light guide plate 32. Please refer to FIG. 4. FIG. 4 is a perspective diagram of a second embodiment of the light guide plates 31', 32' according to the present invention. The light guide plates 31', 32' both comprise the saw-toothed sides 316', 326' along the second direction Y, and the saw-toothed sides 316', 326' match with each other so that the light guide plates 31', 32' can be arranged along the first direction X. Likewise, the contacting and matching relationship of two light guide plates are adapted to all light guide plates in the present invention.

Figure 5:
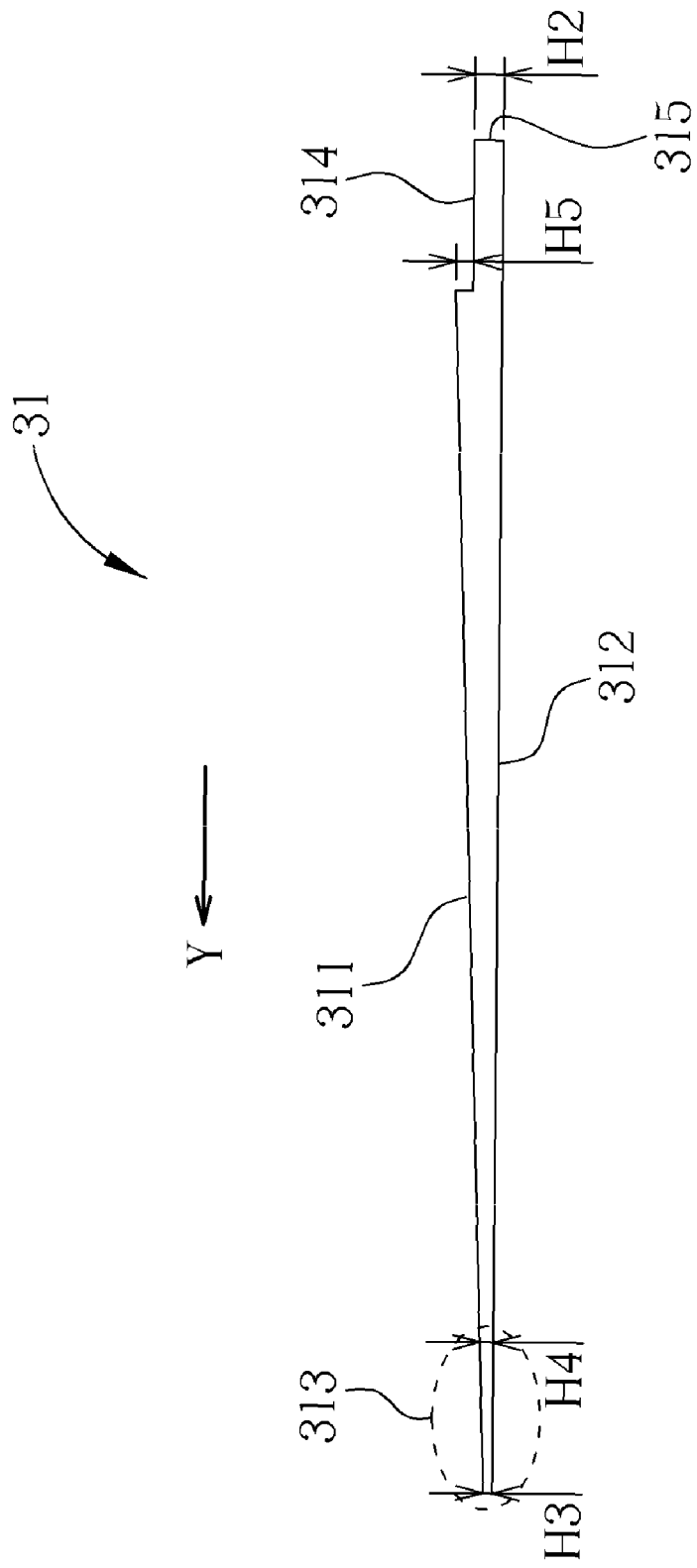
FIG. 5 is a sectional view of the first embodiment of the light guide plate according to the present invention.
Figure 6:
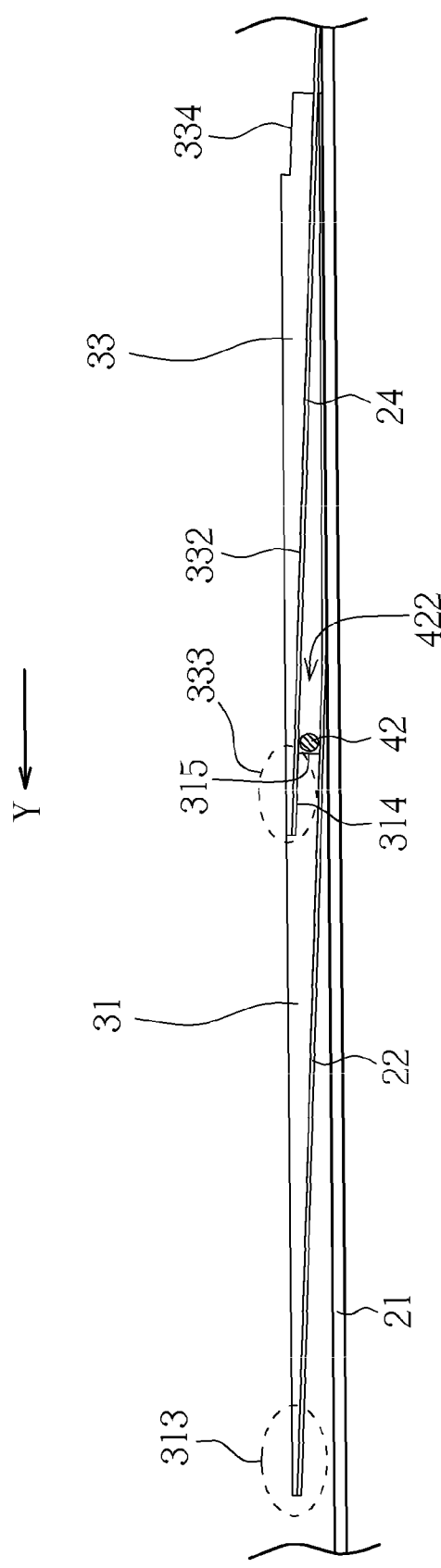
FIG. 6 is a sectional view of the first embodiment of the backlight assembly according to the present invention.
Figure 7:
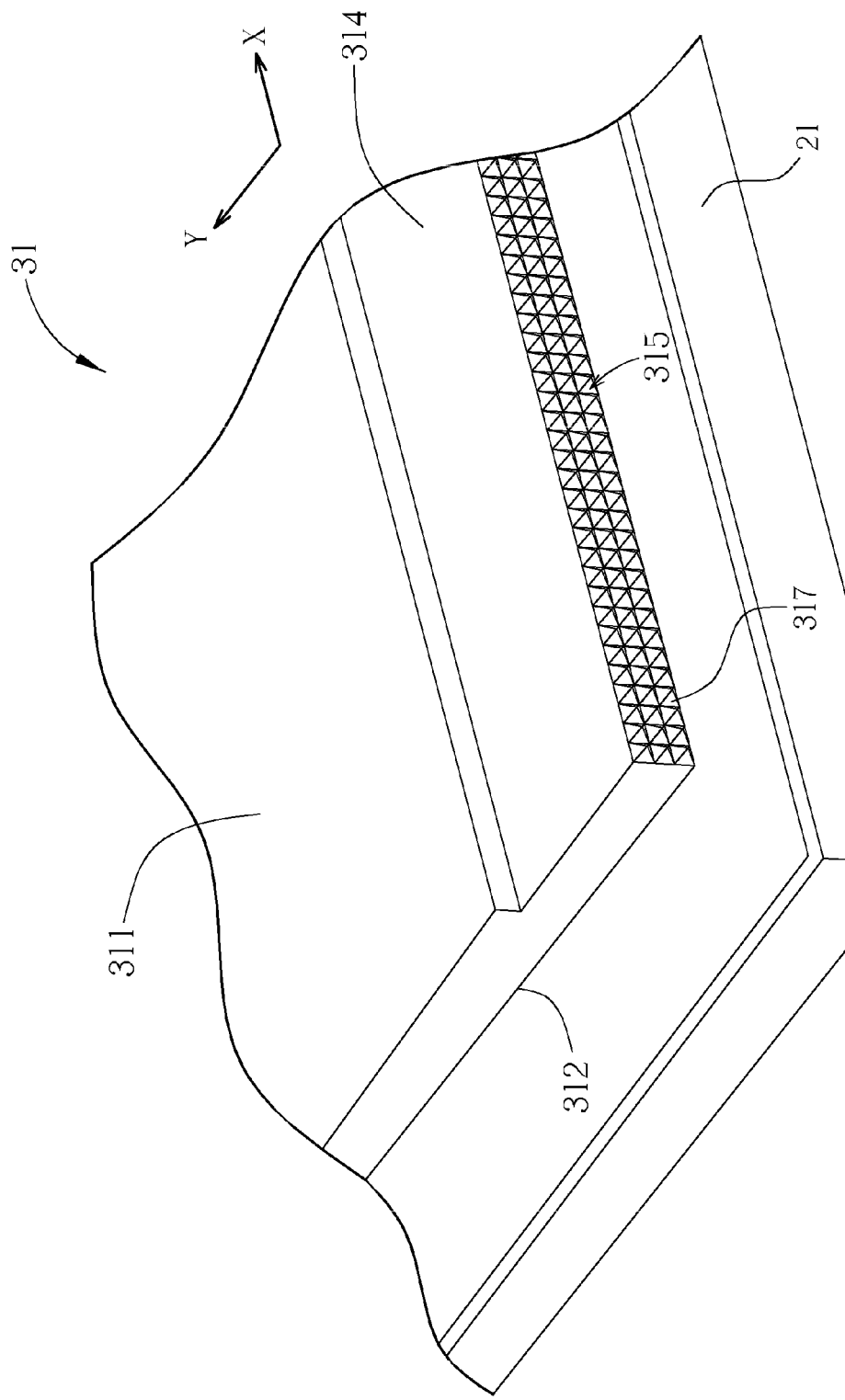
FIG. 7 is a perspective explosive diagram of a third embodiment of the backlight assembly according to the present invention.

Please refer to FIG. 5, FIG. 6, and FIG. 7. FIG. 5 is a sectional view of the first embodiment of the light guide plate 31 according to the present invention. FIG. 6 is a sectional view of the first embodiment of the backlight assembly 20 according to the present invention. The light guide plate 31 includes an emitting plane 311, a bottom 312, a tail section 313, an indentation 314, and an incident side 315. The section view of the light guide plate 31 shows a wedge structure in this embodiment. Also in this embodiment, the height H2 of the incident side 315 ranges between 0.24 inches and 0.79 inches, the height (or depth) H5 between the indentation 314 and the emitting plane 311 ranges between 0.29 inches and 0.55 inches, and the thickness (including H3 and H4) of the tail section 313 ranges between 0.25 inches and 0.47 inches. The tail section 313 of the light guide plate 31 is a gradually-narrowing structure. The thickness H4 corresponding to the incident side 315 is larger than the thickness of the rest of the tail section 313, and the thickness H3 corresponding to the incident side 315 is smaller than the thickness of the rest of the tail section 313. FIG. 7 is a perspective explosive diagram of a third embodiment of the backlight assembly according to the present invention. The light guide plate 31 can further include a plurality of micro-structures 317 on the incident side 315. The micro-structures 317 can be a plurality of tetrahedrons arranged in a matrix manner or a plurality of rhombohedrons (or prisms) extending perpendicular to the back plate 21 for increasing the luminous flux of the light module in the incident side 315. It is not limited in the present invention.

Please refer to FIG. 6. The tail section 313 of the light guide plate 33 is configured on the indentation 314 of the light guide plate 31, while another tail section of another light guide plate (not shown in Figure) is configured on the indentation 334 of the light guide plate 33. A gap 442 is formed amid the incident side 315 of the light guide plate 31, the bottom 332 of the light guide plate 33 (or the reflector 24 of the bottom 332), and the back plate 21. The light module 42 facing the light guide plate 31 is contained in the gap 442 for providing the incident light for the incident side 315 of the light guide plate 31.

Please also refer to FIG. 3. The first embodiment of the present invention shows that a group of light modules 41~43 are arranged along the first direction X, and another group of light modules 44~46 are also arranged along the first direction X. The light modules 41~43 are parallel with the light modules 44~46. Each of the light modules 44~46 faces the incident sides of two light guide plates respectively. For example, the light module 42 is configured to face the incident sides of the light guide plates 31, 32. In this embodiment, the light modules 41~46 are drove (or controlled) individually by the driving units 51~56. The light module 42 can be a light-emitting diode device including a plurality of light-emitting diodes 421. The driving units 52 can drive individually all light-emitting diodes 421 of the light module 42 so as to provide the same batch of incident light for the incident sides of the light guide plates 31, 32.

Figure 10:
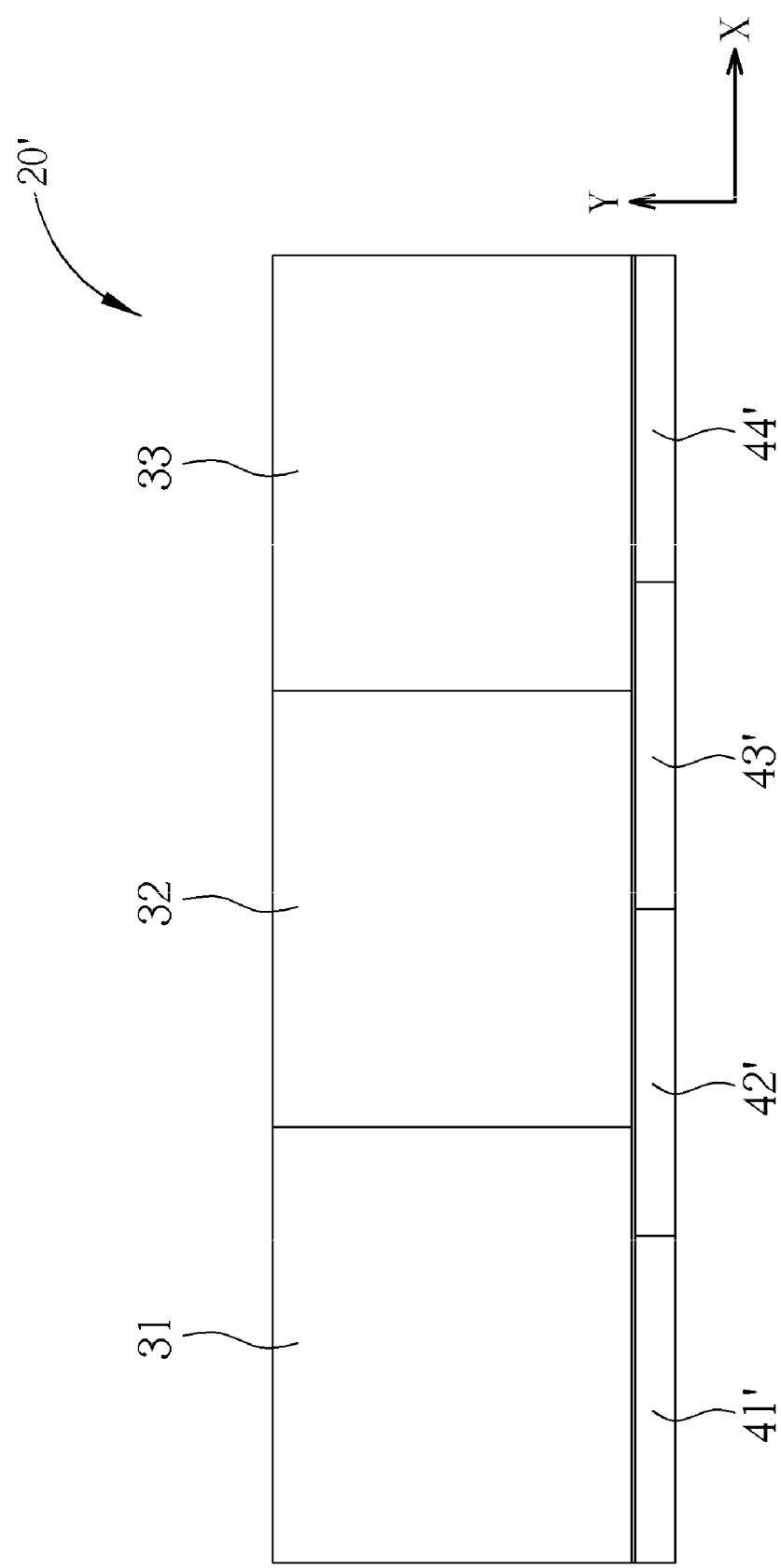
FIG. 10 is a plane diagram of a fifth embodiment of the backlight assembly according to the present invention.

In this embodiment, each of the light modules 41~46 is configured misaligning with two of the light guide plates 31~34. It means that the left half and the right half of one light module equally face half of incident sides of two adjacent light guide plates. For example, the left half of the light module 42 faces the right half of the light guide plate 31, the right half of the light module 42 faces the left half of the light guide plate 32. The length of the light module 42 and incident sides of the light guide plate 31 and the light guide plate 32 are substantially the same. In other embodiment of the present invention, however, the light module can also face the two incident sides of adjacent light guide plates with other proportion. For example, one third of the left light module 42 faces the right half of the light guide plate 31, and two third of the right light module 42 faces the left half of the light guide plate 32. Additionally, the length of the light modules 41'~44' can also differ from the length of the light guide plates 31~33, as shown in a fifth embodiment in FIG. 10. For example, the light modules 41'~44' and the light guide plates 31~33 are configured respectively along the first direction X, three light guide plates 31~33 are collocated with four light modules 41'~44'. While the total length of the three light guide plates 31~33 is the same as the total length of the four light modules 41'~44' along the first direction X, the single length of each incident side of the light guide plates 31~33 differs from the length of each light module. In this embodiment, four light modules 41'~44' are configured misaligning with three light guide plates 31~33, in which the light modules 42' is configured facing the light guide plates 31, 32, the light modules 43' is configured facing the light guide plates 32, 33. In other words, each of the light guide plates 31~33 receives light from two adjacent light modules 41'~44' respectively, which means that the light guide plate 31 faces the light modules 41'~42', the light guide plate 32 faces the light modules 42'~43', and the light guide plate 33 faces the light modules 43'~44'.

Please refer to FIG. 3. Additionally, since each light guide plate 31~34 receives light from two adjacent light modules 41~46 at the same time, light from the two adjacent light modules 41~46 can be mixed after entering one of the light guide plates 31~34, further reducing the difference of light from each light module 41~46. Luminance from the incident sides of the light guide plates 31~34 is much more plane. The shape of the light guide plates 31~34 can be rectangular, square, rectangle-like, or square-like, wherein the rectangle-like or square-like light guide plates are the rectangular or square light guide plates with concave or convex optical structures at the edges thereof.

Figure 1:
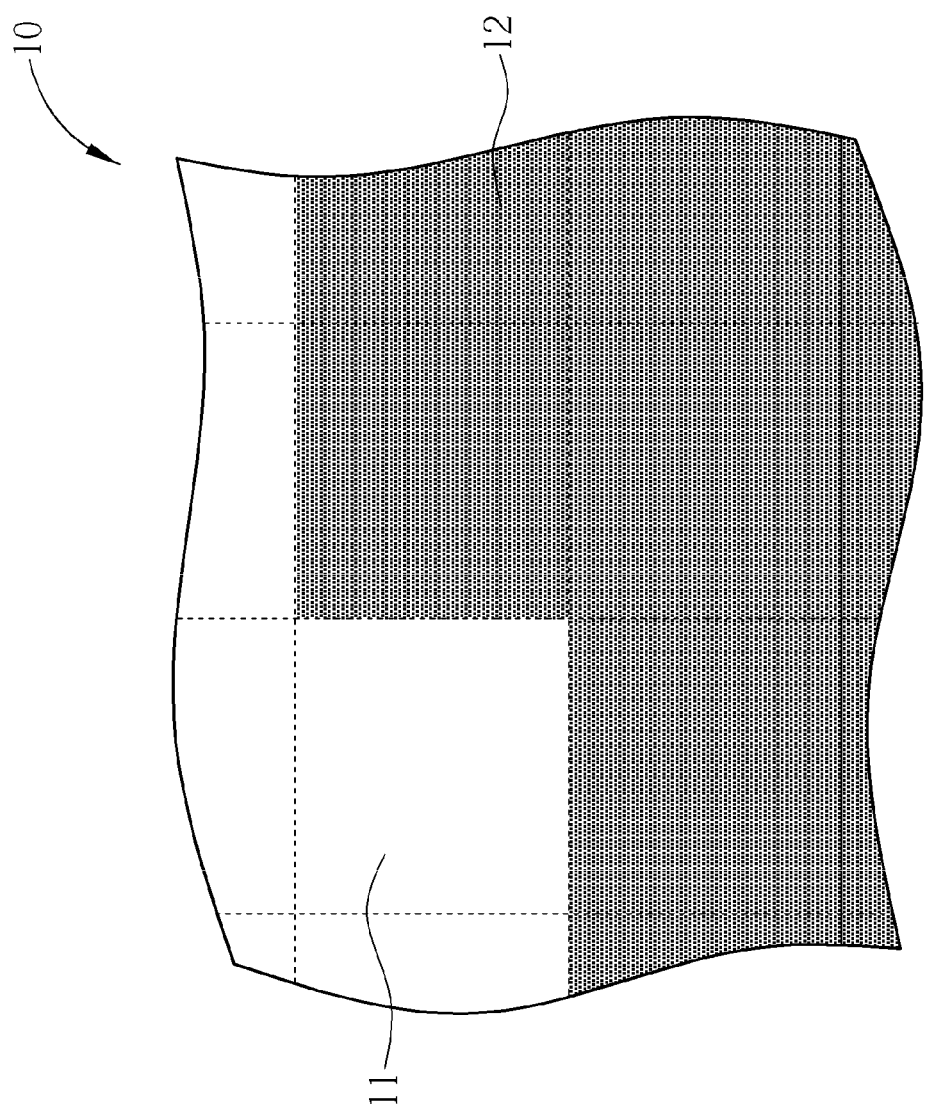
FIG. 1 is a diagram of display effect of a display when a combinative edge lighting backlight assembly performs its local dimming function according to the prior art.
Figure 8:
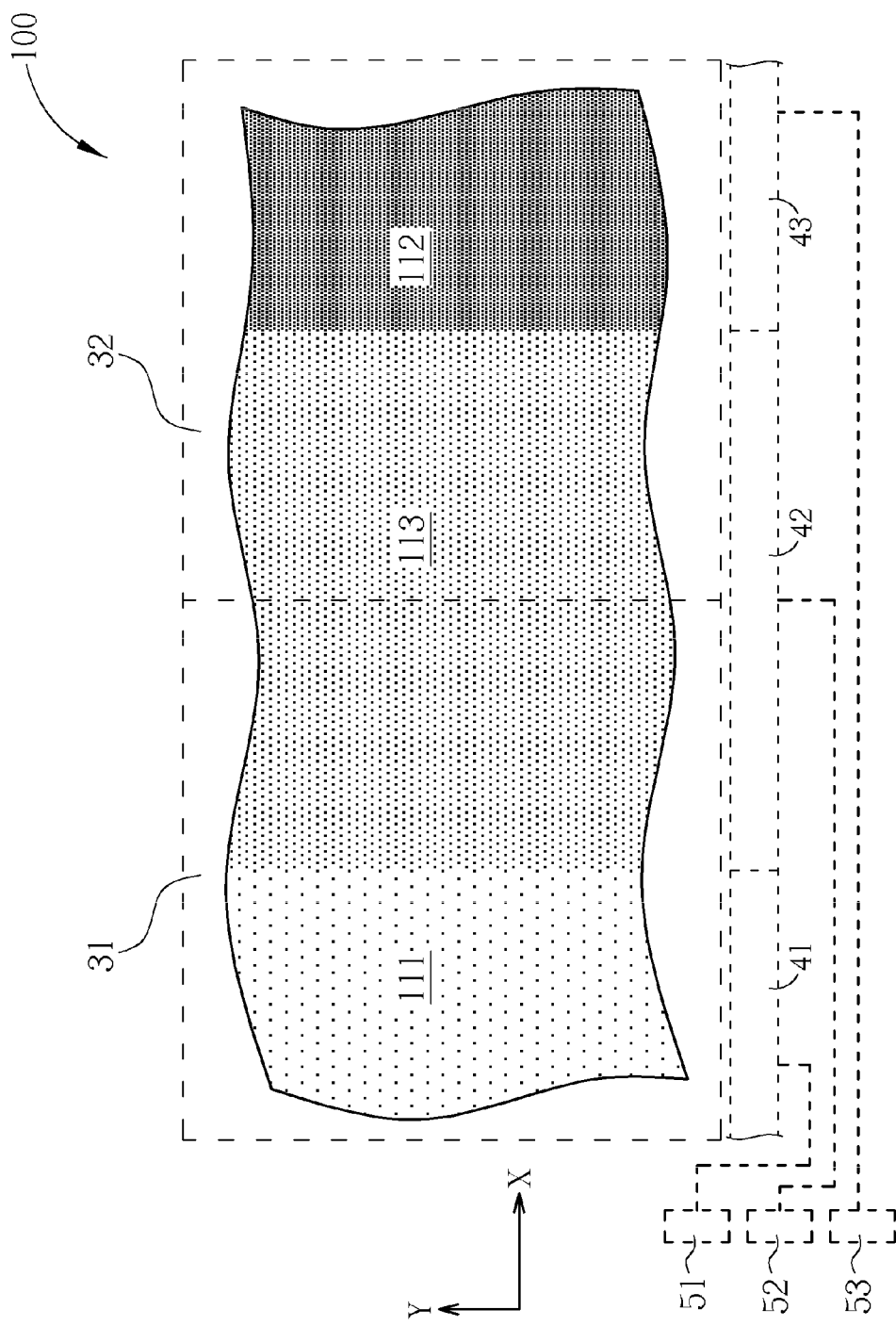
FIG. 8 is a diagram of display effect of the display when the assembly performs its local dimming function according to the first embodiment of the present invention.

Please refer to FIG. 8. FIG. 8 is a diagram of display effect of the display when the assembly performs its local dimming function according to the first embodiment of the present invention. Different from the display effect in FIG. 1, when the local dimming function is performed in the display 100, the light modules 41~43, which misalign with the light guide plate 31 and the light guide plate 32 under the display 100, are driven by each of the driving units 51~53 respectively, each one either turning on or turning off. For example, the driving unit 51 turns on the light module 41 to emit light, and the driving units 52, 53 turn off the light modules 42, 43. The gradual display effect is shown in FIG. 8. In FIG. 8, a darker block 112, a middle block 113, and a lighter block 111 are shown. The adjacent edge between the light guide plate 31 and the light guide plate 32 becomes vague when local dimming function is performed.

Those skilled in the art will readily observe that numerous modifications and alterations of the device and method may be made while retaining the teachings of the invention.

What is claimed is:

1. A backlight assembly comprising:
   a back plate;
   a first light module configured on the back plate;
   a second light module configured on the back plate and arranged adjacent to the first light module along a first direction;
   a first light guide plate configured for facing both the first light module and the second light module and having a first incident side;
   a first driving unit for driving the first light module to provide a first incident light for the first incident side; and
   a second driving unit for driving the second light module to provide a second incident light for the first incident side.

2. The backlight assembly of claim 1, further comprising a first reflector configured between the first light guide plate and the back plate.

3. The backlight assembly of claim 1, further comprising:
   a third light module configured on the back plate and arranged adjacent to the second light module along the first direction;
   a second light guide plate arranged adjacent to the first light guide plate along the first direction, configured for facing both the second light module and the third light module and having a second incident side; and
   a third driving unit for driving the third light module to provide a third incident light for the second incident side.

4. The backlight assembly of claim 3, further comprising a reflector configured between the light guide plates and the back plate and across all light guide plates along the first direction.

5. The backlight assembly of claim 3, wherein the first light guide plate further comprises a first saw-toothed side, and the second light guide plate further comprises a second saw-toothed side, and the second light guide plate is adjacent to the first light guide plate by the first saw-toothed side and the second saw-toothed side contacting or matching with each other.

6. The backlight assembly of claim 3, wherein the first light guide plate further comprises a first plane side, the second light guide plate further comprises a second plane side, and the second light guide plate is adjacent to the first light guide plate by the first plane side and the second plane side contacting each other.

7. The backlight assembly of claim 3, wherein the range of diagonal length of the second light guide plate is between 3.4 inches and 10 inches.

8. The backlight assembly of claim 3, further comprising a second reflector configured between the second light guide plate and the back plate.

9. The backlight assembly of claim 3, further comprising a third light guide plate arranged adjacent to the first light guide plate along a second direction and configured on the back plate.

10. The backlight assembly of claim 9, wherein a gap is formed amid the back plate, the first incident side, and the third light guide plate, and the first light module and the second light module are configured in the gap.

11. The backlight assembly of claim 9, further comprising a third reflector configured between the third light guide plate and the back plate.

12. The backlight assembly of claim 9, wherein the range of diagonal length of the third light guide plate is between 3.4 inches and 10 inches.

13. The backlight assembly of claim 9, wherein the first light guide plate further comprises an indentation, the third light guide plate further comprises a tail section, and the third light guide plate is arranged adjacent to the first light guide plate by configuring the tail section on the indentation.

14. The backlight assembly of claim 13, wherein the tail section is a gradually-narrowing structure, whose thickness near the first incident side is larger than the thickness of the rest of the tail section.

15. The backlight assembly of claim 13, wherein the height of the first incident side ranges between 0.24 inches and 0.79 inches.

16. The backlight assembly of claim 13 wherein the depth of the indentation ranges between 0.29 inches and 0.55 inches.

17. The backlight assembly of claim 13, wherein the thickness of the tail section ranges between 0.25 inches and 0.47 inches.

18. The backlight assembly of claim 1, wherein each of the first light module and the second light module further comprises a plurality of light emitting diodes drove by the corresponding driving unit for providing the corresponding incident light.

19. The backlight assembly of claim 1, wherein the first incident side further comprises a plurality of micro-structures.

20. The backlight assembly of claim 19, wherein the micro-structures are a plurality of tetrahedrons arranged in a matrix manner or a plurality of rhombohedrons extending perpendicular to the back plate.

21. The backlight assembly of claim 1, wherein the range of diagonal length of the first light guide plate is between 3.4 inches and 10 inches.

* * * * *